(12) United States Patent
Stoisits et al.

(10) Patent No.: US 6,236,894 B1
(45) Date of Patent: May 22, 2001

(54) PETROLEUM PRODUCTION OPTIMIZATION UTILIZING ADAPTIVE NETWORK AND GENETIC ALGORITHM TECHNIQUES

(75) Inventors: Richard F. Stoisits, Plano; Kelly D. Crawford, Allen; Donald J. MacAllister, Carrollton; Michael D. McCormack, Plano, all of TX (US)

(73) Assignee: Atlantic Richfield Company, Chicago, IL (US)

( * ) Notice: Subject to any disclaimer, the term of this patent is extended or adjusted under 35 U.S.C. 154(b) by 0 days.

(21) Appl. No.: 08/994,975

(22) Filed: Dec. 19, 1997

(51) Int. Cl.$^7$ .................................................. G05B 13/02
(52) U.S. Cl. ................................ 700/28; 700/32; 166/52
(58) Field of Search .......................... 340/853.3; 700/28, 700/29, 32; 702/9, 102, 45; 73/152.52, 152.19, 152.47, 864.72; 166/245, 306, 250.01, 250.15, 266, 364, 370, 373, 374, 52, 53, 263; 175/48, 50; 299/4, 2

(56) References Cited

U.S. PATENT DOCUMENTS

| | | | |
|---|---|---|---|
| 3,891,836 | * | 6/1975 | Lee .............................................. 700/3 |
| 4,407,017 | * | 9/1983 | Zhilikov et al. ........................... 702/9 |
| 4,633,954 | * | 1/1987 | Dixon et al. ........................... 166/372 |
| 5,687,077 | * | 11/1997 | Gough et al. ............................ 700/31 |
| 5,706,896 | * | 1/1998 | Tubel et al. ............................. 166/313 |
| 5,868,201 | * | 2/1999 | Bussear et al. ........................... 166/53 |
| 5,871,048 | * | 2/1999 | Tokar et al. ............................ 166/243 |
| 5,959,547 | * | 9/1999 | Tubel et al. ........................ 340/853.2 |
| 6,012,015 | * | 1/2000 | Tubel ......................................... 702/6 |
| 6,046,685 | * | 4/2000 | Tubel ................................. 340/853.2 |

* cited by examiner

Primary Examiner—William Grant
Assistant Examiner—Chad Rapp
(74) Attorney, Agent, or Firm—James A. Gabala; Robert E. Sloat; Rodney M. Anderson

(57) ABSTRACT

A computer system and method of operating the same to optimize the operating conditions of a petroleum production field, in which a plurality of wells are arranged according to drill sites, and connected to one or more central processing facilities, is disclosed. In this disclosed embodiment, gas compression capacity is a significant constraint on the operation of the complex production field, and surface line hydraulic effects of well production are to be considered in the optimization. A genetic algorithm is used to generate, and iteratively evaluate solution vectors, which are combinations of field operating parameters such as incremental gas-oil ratio cutoff and formation gas-oil ratio cutoff values. The evaluation includes the operation of an adaptive network to determine production header pressures, followed by modification of well output estimates to account for changes in the production header pressure. Convergence of the genetic algorithm identifies one of the solution vectors as containing an optimal combination of field operating parameters that may be used by production personnel to set the operating conditions of the field.

23 Claims, 8 Drawing Sheets

PETROLEUM PRODUCTION OPTIMIZATION UTILIZING ADAPTIVE NETWORK AND GENETIC ALGORITHM TECHNIQUES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of oil and gas production, and is more specifically directed to production optimization from large production fields.

As is well known in the art, modern large oil and gas production fields may include hundreds of wells and a complex network of surface-deployed pipelines ("surface lines") that interconnect these wells with centralized processing facilities. Conventional central processing facilities include such equipment as separators, gas compressors, and the like. While the primary production phase of operation may be effected in a relatively straightforward manner, later life operation of the production field requires important decisions for optimum production and economic return.

The decisions involved in later life production operation includes so-called secondary processes. Typically, secondary production processes are used to increase and continue production from modern production fields. These secondary processes may include waterflooding of the field, gas lift operations applied to individual wells, and also the injection of gas into the formation. Secondary production operations are typically ongoing operations that may be managed on as frequently as a daily basis.

Gas lift is a secondary recovery technique in which gas is injected into an annulus surrounding the production tubing in a producing well. As is fundamental in the art, incremental fluid flow from a well is approximately proportional to the difference in pressure between the reservoir pressure and the pressure in the production tubing at the reservoir depth (generally referred to as $P_{wf}$). The pressure $P_{wf}$ may be generally considered as the sum of the production header pressure at the wellhead plus the combination of the static head within the well and the frictional losses therein. The injection of lift gas into the tubing string reduces the static head from the wellhead to the reservoir depth, and thus increases the pressure differential between the reservoir pressure and the pressure in the tubing at the reservoir depth. The lift gas also tends to increase the frictional pressure loss in the production tubing, especially at high gas-liquid ratios. Considering that the lift gas becomes part of the outflow from the well, a particular lift gas flow rate generally exists for each well at which oil production is maximized.

Production field operation is often constrained by the capacity of the centralized processing facilities. For example, the capacity of centralized gas compression facilities to compress gas for gas lift operations is a critical factor in the operation of the field, as the maximizing of oil production, at individual wells, can produce more gas than can be handled by the compression facilities, resulting in backpressure on producing wells which suppresses oil production. In "gas-mature" regions of the reservoir, over-injection of gas (through gas injection, rather than gas lift) can cause gas to recycle from injector sites to producing wells, thus increasing the formation gas-oil ratio (FGOR) (generally defined as the gas-oil ratio, of a non-gas-lifted well, for the next incremental volume produced) at the producing wells and further exacerbating the excess gas problem. Furthermore, as a well becomes more mature, the effectiveness of gas lift in increasing oil production decreases (i.e., as evidenced by a higher incremental gas-liquid ratio, or IGOR, which is a measure of the efficiency with which additional oil may be produced with the incremental addition of lift gas); as a result, little or no gas is needed for such high gas-recycle wells. The limitation of gas compression capacity is especially problematic for those remote production fields from which produced natural gas is not brought to market, but instead is used only as local fuel, for gas lift injection, for immiscible or miscible injection for reservoir pressure support, or simply to occupy storage areas of the reservoir.

These operations are made significantly more complex by variations in well maturity over a large number of wells in the production field in combination with limited gas handling capacity. If gas handling capacity were effectively infinite, all wells could be in production, regardless of their FGOR and IGOR, and gas-lifted wells could be operated at maximum output rate. However, gas compression capacity limitations require the amount of produced gas (i.e., the sum of formation and lift gas) to be controlled, which in turn limits the extent to which gas lift operations may be carried out, such that gas lift is applied only to those wells having low IGORs. Because well maturity varies from well-to-well over the production field, these production management decisions must be made on substantially a well-by-well basis.

One conventional approach to production field management is to determine FGOR and IGOR cutoffs. In this approach, wells having a less favorable IGOR than the IGOR cutoff value do not receive gas lift, and non-gas-lifted wells having a less favorable FGOR than the FGOR cutoff value are simply shut-in; this approach is intended to maximize oil production while keeping gas output at or below the compression capacity. Considering that a large number of wells are present in a modern field, however, it is difficult to optimize the FGOR and IGOR cutoff values for such fields. Besides changes in the gas-oil ratios (FGOR and IGOR), the water "load" produced by each well also varies with well maturity and may have to be considered in the production decisions, further complicating the optimization process.

As noted above, the wells in a modern production field are linked together by a network of surface lines which transport the produced gas, oil, and water from each well to the centralized processing facilities. The capacity and pressure within each of the surface lines is an important factor in the production from its associated wells, because, as noted above, it is the pressure differential between the reservoir pressure and the wellhead pressure (plus the static head and frictional losses in the well) that determines the volume of production from the well. In large production fields, however, the wellhead pressure is determined by the oil, water, and gas loads from other wells at the same drill site, from other drill sites, and also the capacity of the central processing facilities, relative to the field production. This complex interaction of the wells with one another, and also with the central processing facilities, still further complicates the optimization of field operations.

Heretofore, petroleum production optimization has generally focused on sequential univariate optimization of variables within individual wells. One type of conventional modeling is applied to individual wells to determine output flow rates therefrom, and is referred to in the art as "nodal analysis". An example of nodal analysis is provided in Mach, "Apply nodal analysis to production systems," *Well Servicing* (January/February 1981), pp. 38–45. As described therein, nodal analysis models each producing well by analyzing each downhole and surface point at which a production pressure drop is present. Each pressure drop point is classified as a node, and a pressure or flow rate response function is assigned thereto. Solution of the system of equations, for example by way of a graphical technique, provides a solution function for the output from the well as a function of one of the pressures, such as reservoir pressure, wellhead pressure, or pressure at the bottom of the well hole ($P_{wf}$). While nodal analysis provides a rigorous model for individual wells, interaction among multiple wells in the production field is not considered by this approach.

Another type of production modeling involves multivariate gas handling optimization over the field. Examples of these optimization approaches are described in Kleyweg, et al., "Gaslift Optimization—Claymore Field", 58th *Annual Technical Conference and Exhibition of the Society of Petroleum Engineers* (1983), Paper SPE 11885; Nishikiori, et al., "An Improved Method for Gas Lift Allocation Optimization", 64th *Annual Technical Conference and Exhibition of the Society of Petroleum Engineers* (1989), Paper SPE 19711.

Surface line hydraulics models are also well known in the art. For example, the approach described in Beggs and Brill, "A Study of Two Phase Flow in Inclined Pipes", *Trans. AIME* (1973), pp. 607 et seq., models the pressure drops in surface line networks as a function of flow rates of multiple phases (gas, oil, and water). This, and other, rigorous surface line hydraulic models generally require a great deal of computational resources, even on modern high-performance computers.

Rigorous models of individual well performance, lift gas effect, and surface line hydraulics, have been used in the optimization of production field operations. However, the optimization provided by such models relies upon the determination of derivatives of each of the underlying model functions. In actual field operations, however, the activities carried out by field operators to functionally operate the field are "discontinuous" functions, such as shutting in wells, and initiating lift gas operations. The "discontinuities" resulting from these actual field operations are not compatible with optimization through the application of rigorous, derivative-dependent, models, because derivative-based models are vulnerable to convergence upon local extrema in the modeling of discontinuous events, resulting in inaccurate and poor optimization results. In addition, the optimization of the operation of modern complex production fields, having a large number of individual wells that interact with one another, requires inordinate amounts of computational resources when performed using conventional rigorous models.

By way of further background, the optimization of a modern production field through use of an adaptive network, or "neural network", is described in Stoisits, et al., "Gas Optimization at the Kuparuk River Field", 69th *Annual Technical Conference and Exhibition of the Society of Petroleum Engineers* (1994), Paper SPE 28467, pp. 35–42. As described in this reference, IGOR and FGOR cutoff values are optimized by way of an iterative evaluation process applied to each one of multiple central processing facilities (CPFs), with the produced gas checked against the compression capacity of the CPF. Re-routing of production among the multiple CPFs is also considered in this approach, as wells associated with one CPF that may be shut-in or not gas-lifted may be more productive than producing wells associated with a different (i.e., less loaded) CPF. The surface line hydraulic effects of re-routing production among CPFs are quite complex, however; as such, an adaptive network is used in this approach to replace a conventional surface line hydraulic simulation model, in optimizing the drill site oil, gas, and water rates, and separator pressure, as measured by drill site pressure. The adaptive network described in this reference was trained by way of the well-known back propagation method by operating the network to calculate surface pressure line drops over a wide range of oil, water, and gas flow rates; comparison of the adaptive network results were used in back propagation regression to set the network weighting factors.

By way of further background, optimization methods known as "genetic algorithms" are known in the art. Conventional genetic algorithms serve to select a string (referred to as a "solution vector", or "chromosome"), consisting of digits ("genes") having values ("alleles") that provide the optimum value when applied to a "fitness function" modeling the desired optimization situation. According to this technique, a group, or "generation", of chromosomes is randomly generated, and the fitness function is evaluated for each chromosome. A successor generation is then produced from the previous generation, with selection made according to the evaluated fitness function; for example, a probability function may assign a probability value to each of the chromosomes in the generation according to its fitness function value. In any case, a chromosome that produced a higher fitness function value is more likely to be selected for use in producing the next generation than a chromosome that produced a lower fitness function value. A "reproduction pool" of chromosomes is then produced by random selection of the first generation of chromosomes, with the random selection weighted according to the fitness function results. Pairs of chromosomes are then randomly selected, from the reproduction pool, for "reproduction" with one another by the exchanging of "genes" on either side of a "crossover" point within the chromosomes; the reproduction then produces a second generation of chromosomes for evaluation of the fitness function. Mutation may be introduced through the random alteration of a small fraction (e.g., $\frac{1}{1000}$) of the genes in each generation. Iterative evaluation and reproduction of the chromosomes in this manner eventually converges upon an optimized chromosome.

BRIEF SUMMARY OF THE INVENTION

It is an object of the present invention to provide a system and method of optimizing the operation of a complex and large oil and gas production field, in which discontinuous possible operation of individual wells or productive zones within the wells of the field are considered and optimized.

It is a further object of the present invention to provide such a method and system in which the optimization may be efficiently performed by computer systems of relatively modest performance.

It is a further object of the present invention to provide such a method and system in which operations such as allocation of wells, allocation of lift gas, and the like may be selected in an automated manner.

It is a further object of the present invention to provide such a method and system which is particularly well-suited for production fields having central facility constraints.

Other objects and advantages of the present invention will be apparent to those of ordinary skill in the art having reference to the following specification together with its drawings.

The present invention may be incorporated into a system and method of optimizing production field operations in a complex field, including multiple wells interconnected with at least one central processing facility by way of a network of surface lines. According to the present invention, the production field operations include the selecting of wells, or of productive zones within the wells, to be shut-in, and the selecting of wells to receive lift gas; these selection processes may be made by determination of formation gas-oil ratio (FGOR) and incremental gas-oil ratio (IGOR) cutoff values, respectively. A number of solution vectors, expressed as sets of values of parameters corresponding to the well operations (e.g., IGOR and FGOR cutoffs), with each set corresponding to a plurality of wells associated with a "drill site", are evaluated to determine the output of oil, gas and water for the drill site. These outputs are applied to an adaptive network that models the surface line hydraulic model to determine wellhead pressure, and the fluid output from each well is then modified in response to individual well performance models. Based upon the resulting value of a desired parameter such as oil output, additional solution vectors are generated according to a genetic algorithm approach, and the process repeated until convergence upon an optimized set of field operations.

DETAILED DESCRIPTION OF THE INVENTION

Figure 1:
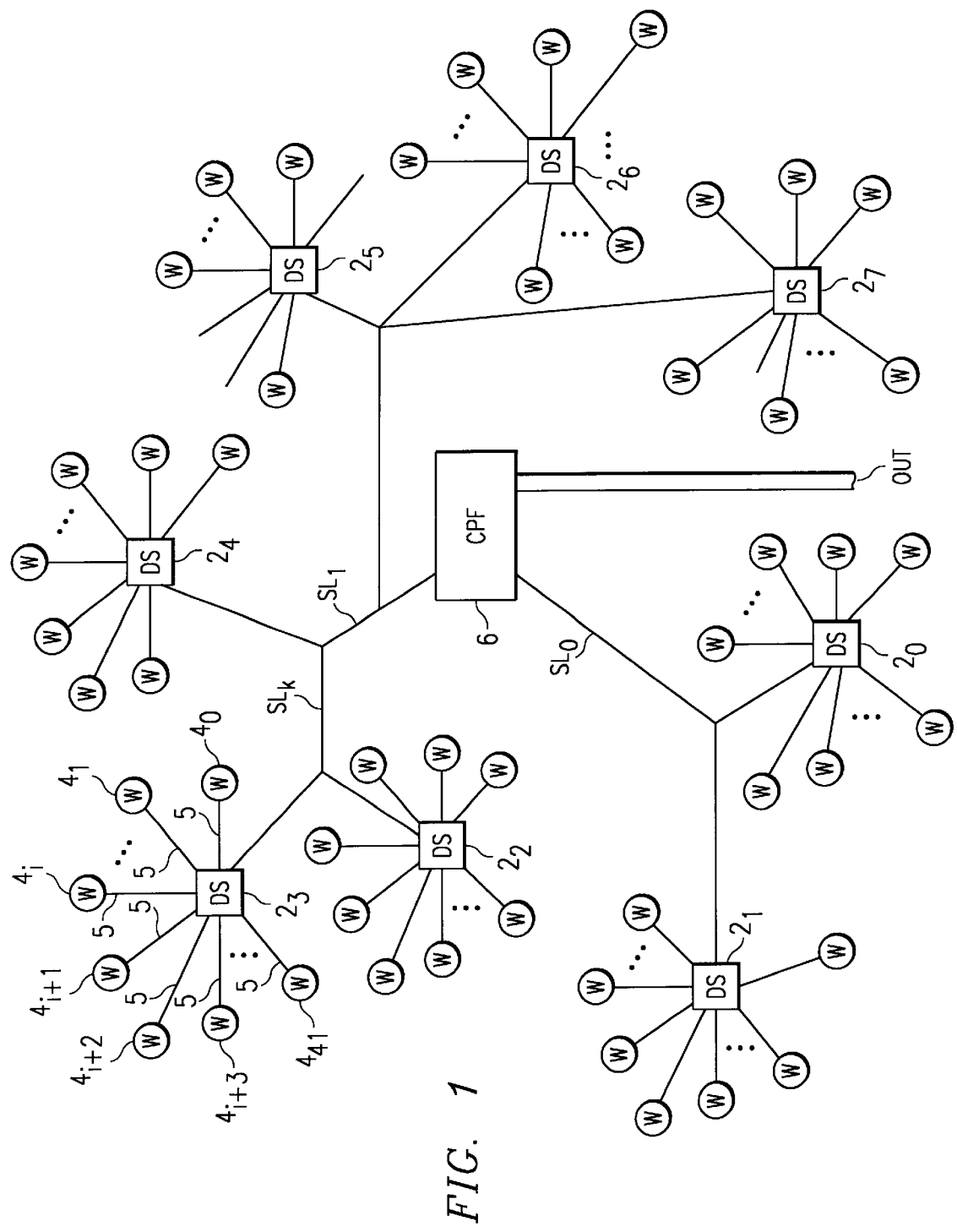
FIG. 1 is a schematic diagram of an exemplary petroleum production field in connection with which the preferred embodiment of the invention may be used.

Referring first to FIG. 1, an exemplary oil and gas production field, including surface facilities, in connection with which the preferred embodiment of the invention may be utilized, is illustrated in a simplified block form. This exemplary field includes many wells 4, deployed at various locations within the field, from which oil and gas products are to be produced in the conventional manner. While a number of wells 4 are illustrated in FIG. 1, it is contemplated that modern production fields in connection with which the present invention may be utilized may include more or less than the number of wells 4 depicted in FIG. 1. Furthermore, it is also contemplated that the present invention may be beneficial in connection with production fields of many arrangements, as well as with production fields having different constraining factors in their optimization and operation from those of the exemplary production field of FIG. 1, it being understood that the production field illustrated in FIG. 1 is provided herein by way of example only.

In this example, each well 4 is connected to an associated one of multiple drill sites 2 in its locale by way of a surface line 5. By way of example, eight drill sites $2_0$ through $2_7$ are illustrated in FIG. 1; it is, of course, understood by those in the art that many more than eight drill sites 2 may be deployed within a production field. Each drill site 2 may support many wells 4; for example drill site $2_3$ is illustrated in FIG. 1 as supporting forty-two wells $4_0$ through $4_{41}$. Each drill site 2 gathers the output from its associated wells 4, and forwards the gathered output to central processing facility 6 via one of surface lines SL.

Figure 2:
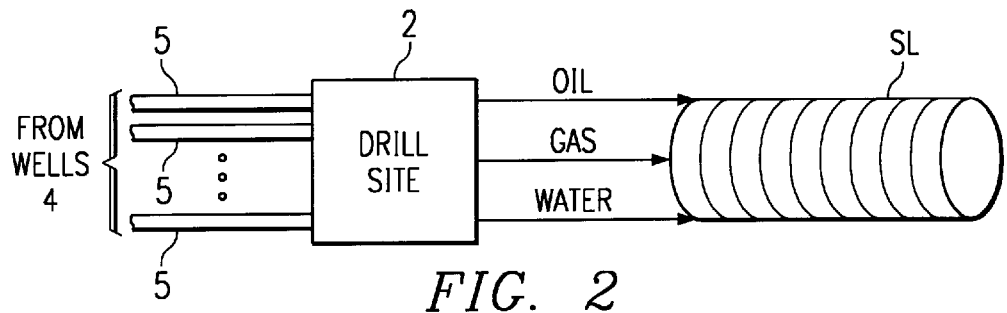
FIG. 2 is a schematic diagram illustrating flows into and out of a drill site in the exemplary petroleum production field of FIG. 1.

As shown in FIG. 2, each drill site 2 receives multiple lines 5, each one of lines 5 being associated with one of wells 4. The combined output from lines 5 at drill site 2 includes three phases, namely oil, gas, and water, which are forwarded together to central processing facility 6 via surface line SL.

Referring back to FIG. 1, multiple ones of drill sites 2 are interconnected by a common one of surface lines SL; for example, drill sites $2_0$ and $2_1$ feed into surface line $SL_0$, while drill sites $2_2$ through $2_7$ feed into surface line $SL_1$. As will be described in detail hereinbelow, the interaction of the output from drill sites 2 into the surface line SL network adds a level of complexity that is important in the optimization of the operation of the production field.

Central processing facility 6 receives surface lines SL from each of drill sites 2. In the example illustrated in FIG. 1, a single central processing facility 6 is illustrated; it is to be understood, of course, that multiple ones of central processing facilities 6 may be included within the production field. Central processing facility 6 receives oil, water, and gas (including both recycled lift gas and formation gas) phases from drill sites 2 via surface lines SL, and includes the appropriate separation and compression equipment for separating the desired phases from one another. The oil output is presented by central processing facility 6 on pipeline OUT illustrated in FIG. 1. Pipeline OUT may connect into a large scale pipeline, may feed a shipping port, or may forward the oil to a storage facility, as appropriate in the particular production operation.

Figure 3:
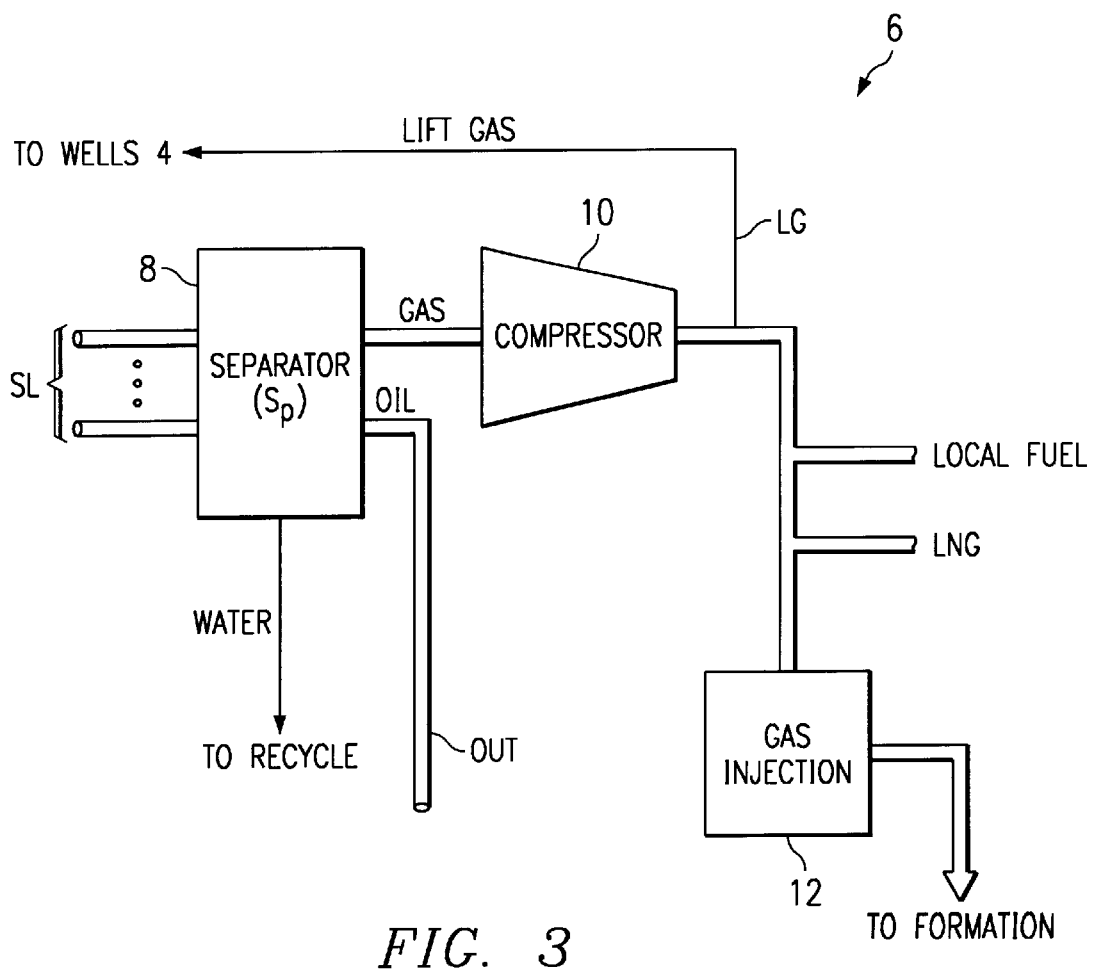
FIG. 3 is a schematic diagram illustrating the construction of a central processing facility in the exemplary petroleum production field of FIG. 1.

FIG. 3 schematically illustrates a simplified example of central processing facility 6. As illustrated in FIG. 3, separator 8 receives surface lines SL from drill sites 2, and is realized by conventional equipment for separating the water, oil, and gas phases from the flow received from drill sites 2. The separated water is recycled, in the conventional manner, and the separated oil is output via pipeline OUT. The separated gas phase is forwarded to compressor 10, which compresses and pumps the separated gas back to wells 4 as lift gas via line LG. In addition, some of the separated compressed gas is used as local fuel, some is applied to a liquification facility for support of liquefied natural gas (LNG) production, and some is forwarded to gas injection pump for reinjection into the formation in a secondary operation. As is evident from FIG. 3, the gas system of this exemplary production field is substantially a closed system, with only the gas used for local fuel and liquification leaving the system. Considering the high cost of equipment such as compressor 10, the exemplary production field has limited gas compression capacity and as such, if excess gas is produced from wells 4 and is applied to compressor 10 beyond its compression capacity, some production wells 4 will be closed to production, or "shut in", so as not to exceed compression capacity.

Modern production fields may include multiple ones of central processing facilities 6. As described in Stoisits, et al., "Gas Optimization at the Kuparuk River Field", *69$^{th}$ Annual Technical Conference and Exhibition of the Society of Petroleum Engineers* (1994), Paper SPE 28467, pp. 35–42, noted hereinabove, the provision of multiple central processing facilities 6 allows for the additional optimization of production through the reallocation of wells 4 to central processing facilities 6. It is contemplated that the preferred embodiment of the present invention will be particularly applicable to the situation of multiple central processing facilities 6. However, for purposes of clarity, the production field in this example will be described for the simple example of a single central processing facility 6.

Figure 4:
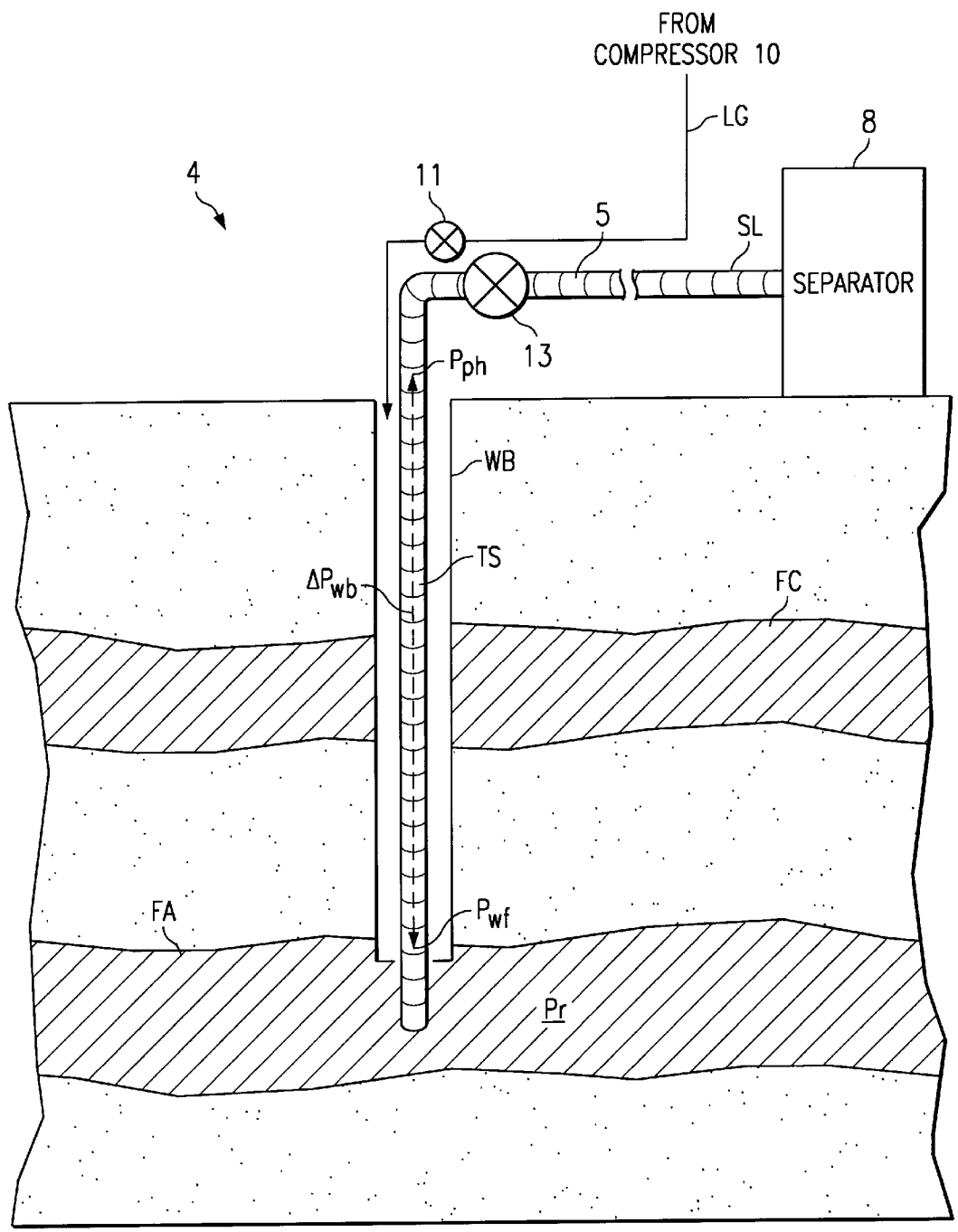
FIG. 4 is a cross-sectional view of a well in the production field of FIG. 1.

Referring now to FIG. 4, an exemplary well 4 in the exemplary production field of FIG. 1 will now be described in detail, particularly in connection with the effects of gas lift operations. Wellbore WB of well 4 in FIG. 4 includes tubing string TS which is in communication with surface line 5 and, via drill site 2 (not shown), surface line SL and separator 8. Tubing string TS extends into wellbore WB at least as deep into the earth as necessary to reach producing formations FC and FA, as shown. Fluid from formations FC and FA flows into tubing string TS and thus to separator 8 via surface lines 5, SL, under the control of control valve 13. Control valve 13, in this example, will shut-in well 4 when closed, and will permit production when open.

In this example, well 4 is of the gas-lifted type. As such, lift gas is provided by compressor 10 (as shown in FIG. 3) via line LG, for injection into wellbore WB under the control of control valve 11. As is known in the art, the injection of lift gas serves to reduce the static head within wellbore WB. One may coarsely approximate the fluid flow Q from formation FA in well 4 as follows:

$$Q\, P_r - P_{wf} = P_r - (P_{wh} + \Delta P_{wb})$$

where $P_r$ is the reservoir pressure of formation FA, and where $P_{wf}$ is the pressure at the bottom of wellbore WB. As indicated in this equation, one may consider $P_{wf}$ as the sum of the wellhead pressure $P_{wh}$ and the static head presented over the depth of wellbore WB (expressed as $\Delta P_{wb}$ in the above equation), plus frictional losses along the well. Injection of lift gas into wellbore WB serves to reduce the static head pressure $\Delta P_{wb}$, which in turn reduces the pressure $P_{wf}$, and thus increases flow Q through tubing string TS.

Accordingly, gas lift operations are useful in increasing the production flow from oil and gas wells.

As noted above, however, lift gas injection into well 4 can suppress production at high fluid flow rates, because the increasing frictional losses within tubing string TS at high flow rates overrides the reduction of static head pressure provided by the lift gas. The flow of both the lift gas itself and also the increased production flow travel through tubing string TS must be considered in this effect. Accordingly, a lift gas injection rate generally exists, for each well, at which the flow output is at a maximum. In the exemplary production field of FIG. 1, however, where gas compression capacity is the primary production constraint, it is preferable to consider the production of the oil phase from a well 4 as a function of lift gas rate.

Figure 5:
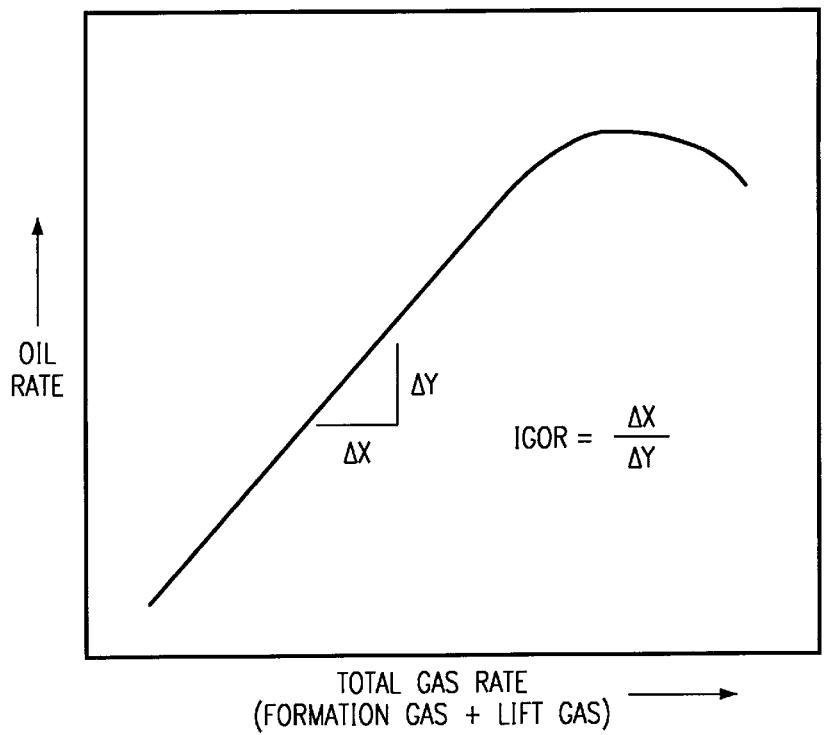
FIG. 5 is a plot of produced oil rate versus total gas rate for an exemplary well or drill site.

FIG. 5 is a plot that qualitatively illustrates the oil production from an exemplary well 4 as a function of total gas rate (which includes both lift gas and formation gas). As illustrated in FIG. 5, the introduction of additional lift gas in turn increases the production of both oil and gas, to a point at which oil production begins to fall; as such, a total gas rate (and thus a lift gas rate) at which oil production is at a maximum can be determined.

Additionally, as evident from FIG. 5, one may readily derive the ratio of the rate of change of gas produced to the rate of change of oil produced. This ratio is referred to in the art as the incremental gas-oil ratio (IGOR), and is a measure of the efficiency with which additional oil may be produced with the incremental addition of lift gas. In the case in which gas compression capacity is limited, such as in the exemplary production field of FIG. 1, the IGOR is an important measure of a well 4, as it may be used to determine the amount of lift gas to be allocated to the well 4.

Referring back to FIG. 1 by way of example, production operations are managed, generally on a day-to-day basis, by the selection of cutoff values for formation gas-oil ratio (FGOR) and incremental gas-oil ratio (IGOR) for wells 4 at a particular drill site 2, or alternatively over the entire field. The FGOR cutoff is a gas-oil ratio for non-gas-lifted wells that defines which wells 4 are to be shut-in completely (e.g., by closing control valve 13 of FIG. 4), while the IGOR cutoff is an incremental gas-oil ratio for gas-lifted wells that defines which wells 4 are to receive additional lift gas and which wells 4 are to have their lift gas reduced. It is contemplated that wells 4 may be present in the production field that have FGOR values below the FGOR cutoff (i.e., would not be selected for shut-in) but which will have IGOR values above the IGOR cutoff (i.e., would not be selected to receive any lift gas); such parameters would cause a well 4 to be operated, but not gas-lifted.

According to the preferred embodiment of the invention, IGOR cutoff and FGOR cutoff values are determined for each drill site 2. These IGOR and FGOR cutoff values will determine, for a drill site 2, which of its wells 4 will be shut-in and which will receive lift gas, and will thus determine the operating state of that drill site 2 for a selected period of time. As such, the IGOR and FGOR cutoff values will serve as field operating parameters for this exemplary production field, as these parameters may be used by the operations staff to operate the field. The method according to the preferred embodiment of the present invention is intended to optimize the allocation of wells to production, and the allocation of lift gas to producing wells, which in this example will be determined by optimization of the IGOR and FGOR cutoff values for maximum oil production, determined individually for each of drill sites 2.

It is of course contemplated that other field operating parameters may be optimized through the use of the present invention, if desired. For example, the combinations of digital shut-in or operating indicators of each of wells 4 in the field may be used; in this example, the indicators may correspond to the entire well 4, or pertain to whether individual production zones are shut-in or producing (e.g., selecting either formation FC or FA for production while shutting in production from the other). It is contemplated that those of ordinary skill in the art having reference to this specification will be readily able to utilize the present method in connection with the optimization of these and other alternative field operating parameters.

Figure 6:
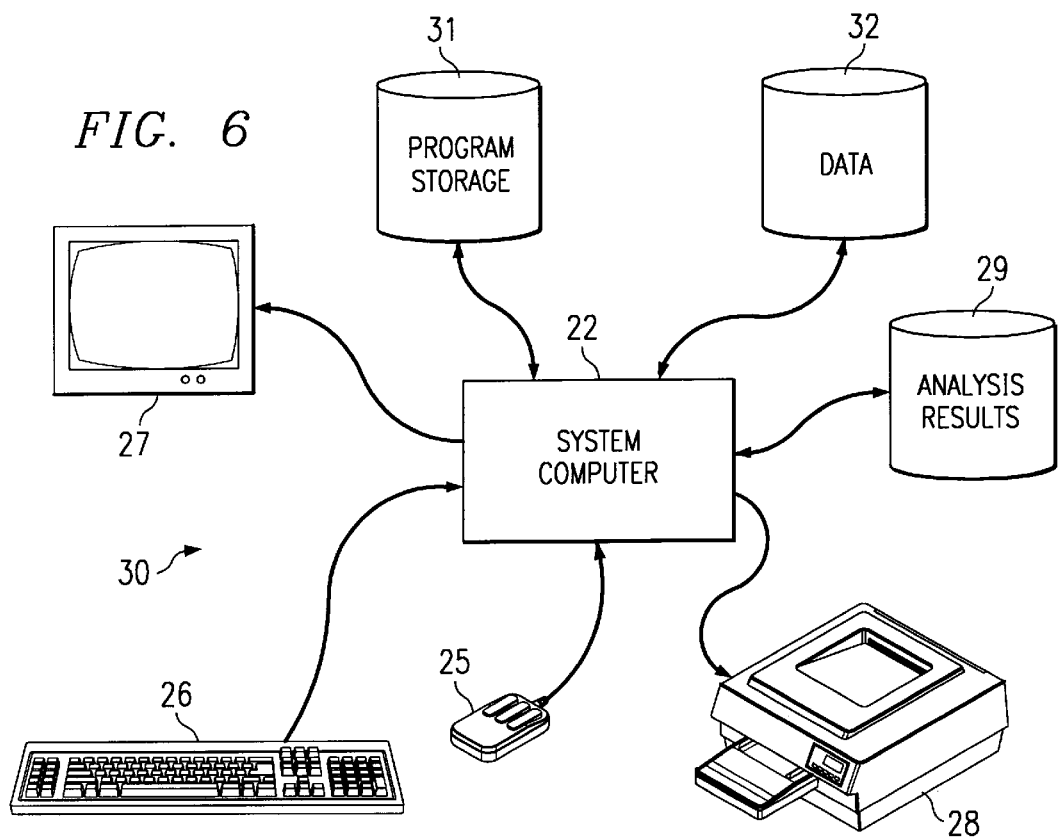
FIG. 6 is an electrical diagram, in block form, of a computer system for performing the optimization method according to the preferred embodiment of the present invention.

Referring now to FIG. 6, the construction of optimization computer system 30 according to the preferred embodiment of the present invention will now be described. This description of optimization computer system 30 is merely an example, as it is to be understood that the present invention may be implemented into a computer system of any suitable architecture, including large mainframe computer systems, distributed computer systems, and the like. It is contemplated that those of ordinary skill in the art will be able to implement the present invention on various arrangements of computer systems.

Optimization computer system 30 includes system computer 22, which may be implemented as any conventional personal computer or workstation, preferably a personal computer (PC) workstation as is well known in the art, implemented either in standalone fashion or as part of a network arrangement. System computer 22 is in communication with disk storage devices 29, 31, 32, which are preferably embodied in one or more hard disk storage devices within system computer 22, or alternatively in a network. It is contemplated that disk storage devices 29, 31, 32 are conventional hard disk drives, and as such will be implemented by way of a local area network or by remote access. Of course, while disk storage devices 29, 31, 32, are illustrated as separate devices, a single disk storage device may of course be used to store any and all of the results, program instructions, and model and measurement data, as desired.

In this embodiment of the invention, data corresponding to the state of the production field, including such data as well data, well models, gas compression capacity, and the like, are stored in digital form on disk storage device 32; according to this embodiment of the invention, disk storage device 32 also stores data corresponding to the weighting factors and structure of an adaptive network modeling hydraulic effects in surface lines SL. System computer 22 can retrieve the appropriate data from disk storage device 32 to perform the desired analysis, according to program instructions corresponding to the preferred embodiment of the invention as described in detail hereinbelow and which are stored in program disk storage device 31. For operation on system computer 22, the program instructions are written in the form of computer programs in a suitable programming language and stored in computer-readable memory, such as program disk storage device 31, in source or object code form. Of course, the memory medium storing the computer program may be of any conventional type used for the storage of computer programs, including hard disk drives, floppy disks, CD-ROM disks, magnetic tape, and the like.

According to the preferred embodiment of the invention, system computer 22 presents output primarily onto graphics display 27, or alternatively via printer 28; further in the alternative, system computer 22 may store the results of the analysis described hereinbelow on disk storage device 29, for later use and further analysis. Keyboard 26 and pointing device 25 (e.g., a mouse, trackball, or the like) are provided with system computer 22 to enable interactive operation. As noted, system computer 22 is able to communicate with disk storage devices 29, 31, 32, including external hard disk storage on a network and floppy disk drives. Optimization computer system 30 is typically located in situ at the production field, but may alternatively be deployed at a remote data center.

Figure 7:
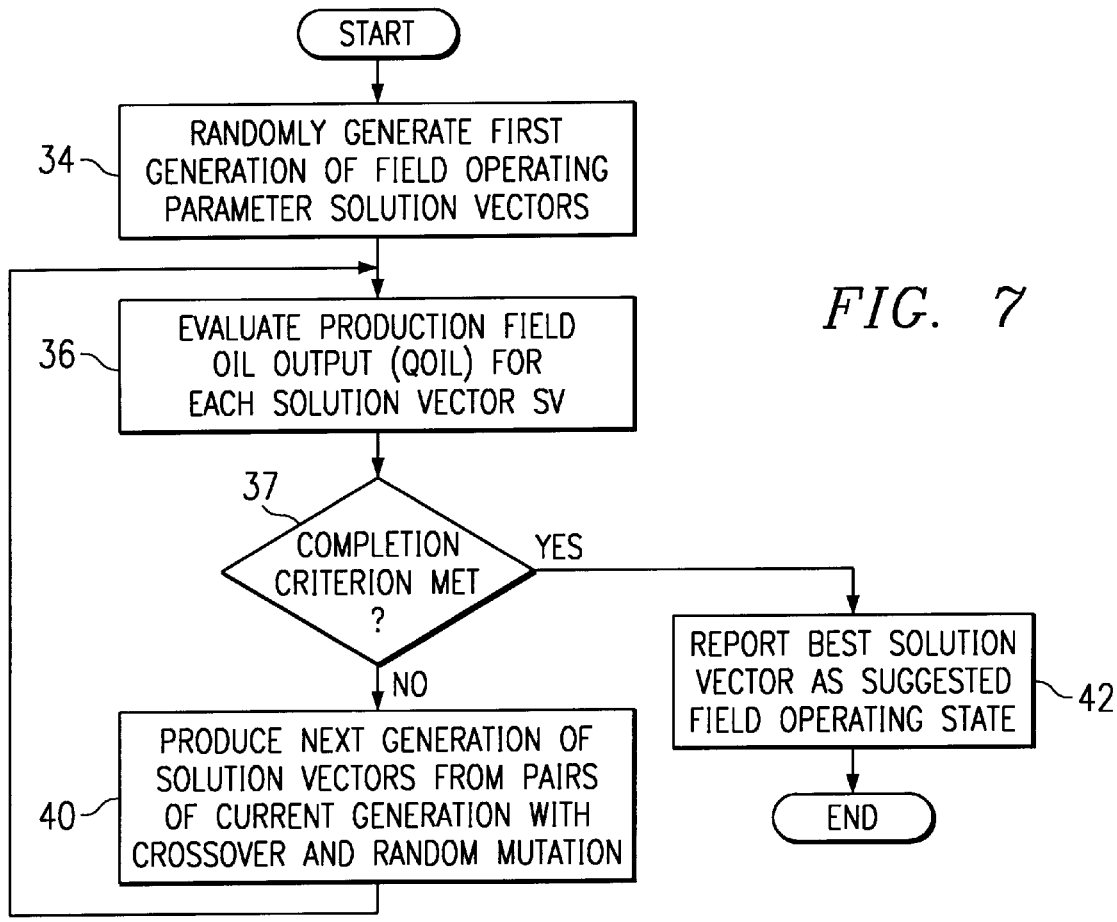
FIG. 7 is a flow chart illustrating the operation of the optimization method according to the preferred embodiment of the present invention.

Referring now to FIG. 7, the operation of optimization computer system 30 according to the preferred embodiment of the present invention will in detail. It is contemplated that those of ordinary skill in the art having referenced to this specification will be readily able to provide the necessary and appropriate programming of system computer 22 in optimization computer system 30 for performing the method that will now be described relative to FIG. 7.

According to the preferred embodiment of the present invention, system computer 22 begins the optimization process in process 34, by randomly generating a first generation of field operating parameter solution vectors, or chromosomes. Each solution vector generated in process 34 includes one or more parameters that production field operating personnel can use in determining the conditions under which the production field is to be operated, as described above; these parameters serve as inputs into the optimization process of the preferred embodiment of the invention. As such, the optimization process is intended to produce a final solution vector with values for each field operating parameter that the field operating personnel may use in placing the production field in an optimal operating condition, taking into account such effects as gas lift efficiency, gas compression capacity, and the hydraulic interaction of wells in the network of surface lines.

Figure 8A:
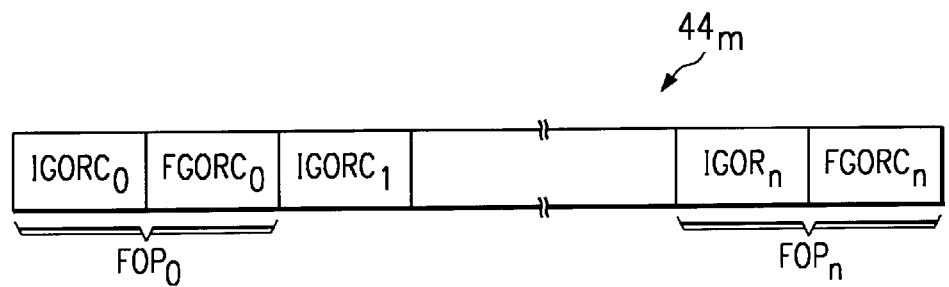
FIG. 8a is a diagram illustrating the contents of a solution vector used in the optimization method according to a first preferred embodiment of the present invention.

FIG. 8a illustrates the construction of an exemplary solution vector $44_m$ produced by system computer 22 in process 34 according to the preferred embodiment of the invention. In this example, solution vector $44_m$ includes multiple field operating parameters $FOP_0$ through $FOP_n$, each field operating parameter FOP being associated with one of drill sites 2 in the production field (FIG. 1). Also in this example, each field operating parameter $FOP_i$ includes two components, namely incremental gas-oil ratio cutoff value $IGORC_i$ and formation gas-oil ratio cutoff value $FGORC_i$. As described above, incremental gas-oil ratio cutoff value $IGORC_i$ is the value of the gas-oil ratio, for an incremental volume of lift gas, above which wells 4 associated with drill site $2_i$ will not receive additional lift gas; formation gas-oil ratio cutoff value $FGORC_i$ is the value of the formation gas-oil ratio above which wells 4 associated with drill site $2_i$ will be shut in.

Figure 8B:
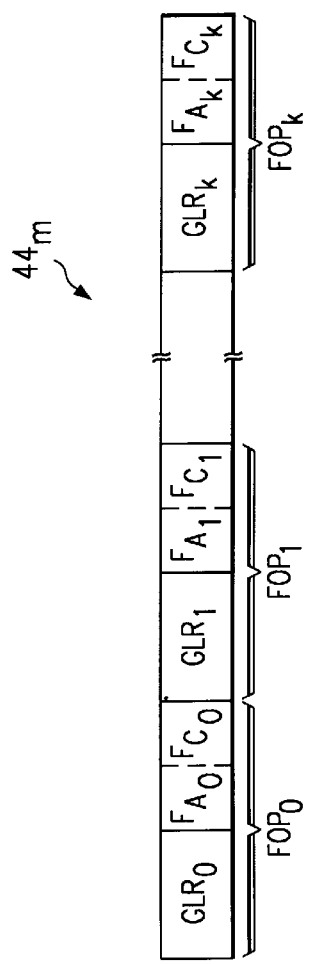
FIG. 8b is a diagram illustrating the contents of a solution vector used in the optimization method according to a second preferred embodiment of the present invention.

Of course, other parameters may alternatively be used in combination with, or instead of, the incremental gas-oil ratio cutoff value $IGORC_i$ and formation gas-oil ratio cutoff value $FGORC_i$ used in connection with the preferred embodiment of the invention. FIG. 8b illustrates an alternative realization in solution vector $44_m'$. Solution vector $44_m'$ includes multiple field operating parameters FOP, as before. Each field operating parameter FOP in solution vector $44_m'$ according to this embodiment of the invention is directed to a particular one of the k+1 wells $4_0$ through $4_k$ in the production field. In this example, field operating parameter $FOP_0$ includes a digital value $GLR_0$ representative of the gas lift rate applied to well $4_0$, and includes flag bits $FA_0$ and $FC_0$ that indicate, when set, that well $4_0$ is permitted to produce from formations FA and FC, respectively (see FIG. 3). Field operating parameters $FOP_1$ through $FOP_k$ are similarly implemented, and correspond to wells $4_1$ through $4_k$, respectively.

Referring back to FIG. 7, process 34 randomly generates a first "generation" of solution vectors 44. The number of solution vectors 44 in the generation may vary widely, and depends in large part upon the capabilities of system computer 22 in combination with the number n+1 of field operating parameters FOP in each solution vector 44. While the number of solution vectors 44 in this first generation produced in process 34 may vary widely, it is contemplated that this first generation may include hundreds, or as many as one thousand, solution vectors 44. The particular values of incremental gas-oil ratio cutoff value IGORC and formation gas-oil ratio cutoff value FGORC within field operating parameters FOP are preferably constrained within certain bounds determined from the characteristics of wells 4 in the production field.

Process 36 is next performed by optimization computer system 30, to evaluate the production field output for each of the solution vectors 44 in the first generation produced in process 34. The evaluation performed in process 36 produces a fitness function value according to which the desirability of the conditions corresponding to the application of the set of field operating parameters FOP specified in each of the solution vectors is produced. According to the preferred embodiment of the invention, where no gas is to be produced to market from the production field of FIG. 1, oil output (QOIL) from the overall production field is a useful measurement by which selection of the optimized solution vector 44 of field operating parameters FOP may be made. Of course, oil output QOIL together with other factors such as gas output (QGAS) may be used in the optimization where some or all of the gas produced from the production field is marketed. In addition, as will be described hereinbelow in further detail, gas output QGAS from the production field, specifically relative to the gas compression capacity of central processing facility 6, is used in combination with the oil output to optimize the configuration of the production field. Of course, other parameters related to the desired production field operation may alternatively or additionally be used in this optimization.

Figure 9:
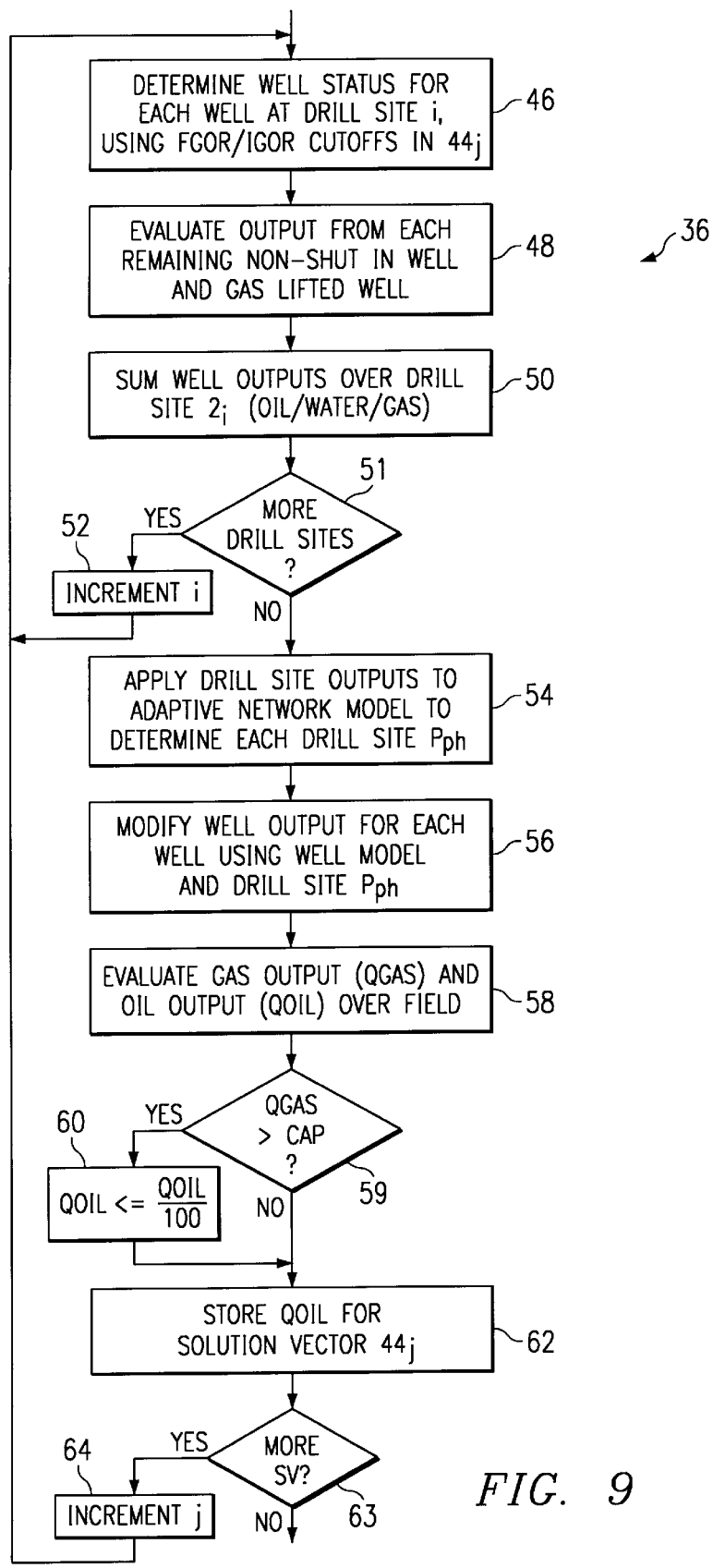
FIG. 9 is a flow chart illustrating the operation of the evaluation of solution vectors according to the preferred embodiment of the invention.

While evaluation process 36 may be performed according to rigorous well and surface line hydraulics models, according to the preferred embodiment of the present invention, evaluation process 36 is performed by system computer 22 operating an adaptive network (which may also referred to as a neural network) that models the production field. As described in the above-referenced Stoisits, et al. reference, an adaptive network computer program is particularly beneficial in the modeling of surface line hydraulics, because the adaptive network, operating in recall mode, significantly reduces the computational time required for evaluation of the model, and is also less vulnerable to convergence problems such as local extrema. Referring now to FIG. 9, the operation of optimization computer system 30 in performing evaluation process 36, according to the preferred embodiment of the invention, will now be described in detail.

Process 36 begins with system computer 22 determining the well status of each well 4 within a selected drill site 2$_i$, using the incremental gas-oil ratio cutoff value IGORC$_i$ and formation gas-oil ratio cutoff value FGORC$_i$ within a selected solution vector 44$_j$. Process 46 is performed by system computer 22 retrieving well data for each well 4 at drill site 2$_i$, such well data including oil output versus gas production relationships similar to the example of FIG. 5. In this example, process 46 eliminates any wells 4 having a formation gas-oil ratio above formation gas-oil ratio cutoff value FGORC$_i$ in solution vector 44$_j$ (modeling these wells as shut-in), and applies gas lift to those wells 4 having an incremental gas-oil ratio below the incremental gas-oil ratio cutoff value IGORC$_i$ in solution vector 44$_j$. Process 46 is completed by system computer 22 storing, in its active memory or in one of disk storage devices 29, 32, a list of those wells 4 associated with drill site 2$_i$ that are not shut-in, and those wells 4 that are to be evaluated as gas-lifted.

Once the producing wells 4 at drill site 2$_i$ are defined, process 48 is performed by system computer 22 to evaluate the output from the defined wells 4 from process 46. This evaluation process 48 is performed by determining, from the well data and other stored information, the fluid output from each remaining non-shut-in or gas-lifted well 4, assuming the gas lift rates for gas-lifted wells 4 that are indicated by the solution vector 44. The result of process 48 is thus a total liquid flow estimate for each well 4 at drill site 2$_i$, with no indication of the volume of the various phases (oil, gas, water) yet derived. In process 50, system computer 22 determines the fluid output for each of the oil, gas, and water phases, using previously gathered data for wells 4 at drill site 2$_i$. Decision 51 is then performed by system computer 22 to interrogate whether additional drill sites 2 are to be similarly evaluated; if so, drill site index i is incremented in process 52, and selection and evaluation processes 46, 48, 50 are repeated for the next drill site 2. Upon completion of processes 46, 48, 50 for all of drill sites 2 in the production field (decision 51 is NO), control passes to process 54.

In process 54, system computer 22 applies each of the drill site output flow volumes determined in each pass through process 50 to an adaptive network model of the hydraulic response of the network of surface lines SL, to provide an estimate of the production header pressure P$_{ph}$ encountered at each of the drill sites 2 for the volume of production estimated in the passes through process 50. The adaptive network model of process 50 is described in detail in the above-referenced Stoisits, et al., reference, which is incorporated hereinto by this reference. For purposes of clarity, however, the operation of the adaptive network 50 by system computer 22 will now be described in detail relative to FIG. 10.

Figure 10:
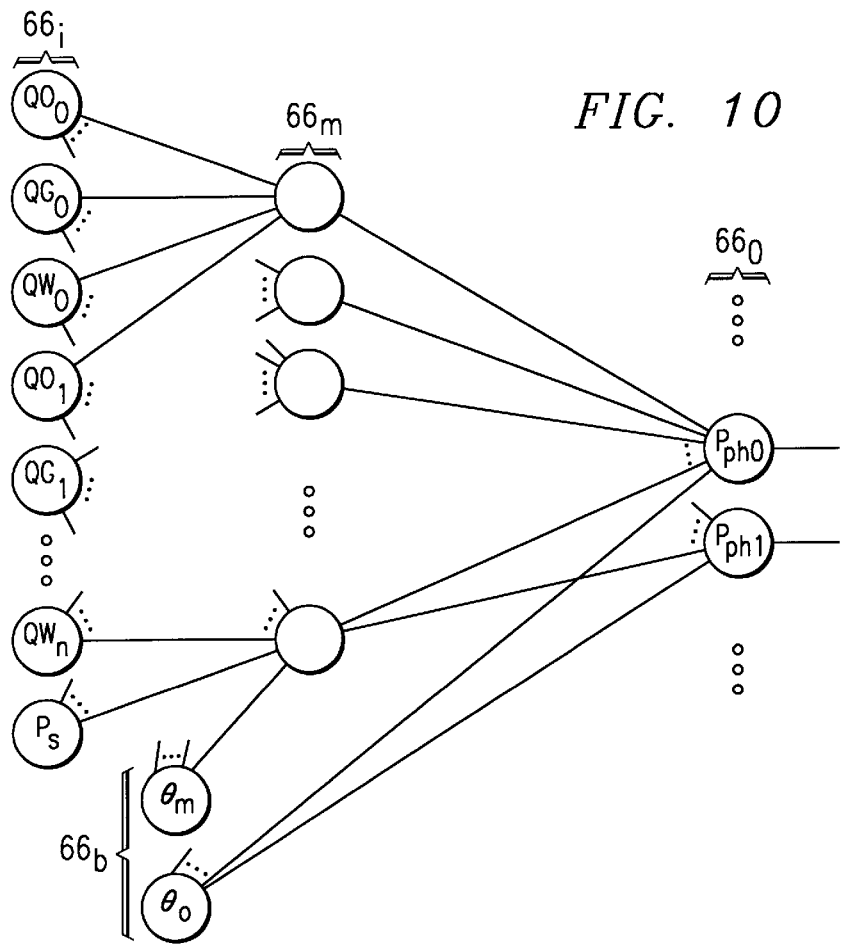
FIG. 10 is a schematic diagram illustrating an adaptive network as used in surface line hydraulics modeling according to the preferred embodiment of the present invention.

FIG. 10 illustrates a three-layer adaptive network as useful in connection with the present invention. This adaptive network includes input nodes 66$i$ for receiving input data values, middle-layer nodes 66$m$ that receive and sum (in a weighted manner), data values received by corresponding ones of input nodes 66$i$, and one or more output nodes 66$o$ that receive and sum (also in a weighted manner) corresponding outputs of middle nodes 66$m$. The input data values applied to input nodes 66$i$, in this embodiment of the invention, include the oil, gas, and water output from each of drill sites 2 as determined in process 50. For example, in the adaptive network of FIG. 10, the input data values QO$_0$, QG$_0$, QW$_0$ correspond to the oil, gas, and water production from drill site 2$_0$, and are applied to individual ones of input nodes 66$i$ as shown; similarly, input data values QO$_n$, QG$_n$, QW$_n$ corresponding to the oil, gas, and water production from each drill site 2$_n$ are similarly applied to input nodes 66$i$. Other input data may also be applied to an input node 66$i$; for example, according to the preferred embodiment of the invention, the pressure S$_p$ at separator 8 of central processing facility 6 (see FIG. 3) is also applied to one of the input nodes 66$i$ of the adaptive network. As is conventional in the art, one or more bias nodes 66$b$ may also be provided, to provide bias value $\theta_m$ to middle nodes 66$m$ and bias value $\theta_o$ to output nodes 66$o$; bias values $\theta_m$, $\theta_o$ bias the relative weighting of the effect of the middle nodes 66$m$ and output nodes 66$o$ on the final result.

Each of the values applied to input nodes 66$i$ is forwarded to each of the middle nodes 66$m$. Each middle node 66$m$ performs a weighted sum of the values received at its inputs, and applies this weighted sum to a function in order to generate an output. This weighted sum $I_j$ generated by the jth middle node 66m may be expressed as:

$$I_j = \sigma(W_{j,i} O_i + \theta_m)$$

where $O_i$ is the output from the ith one of input nodes 66i, and where $W_{j,i}$ is the weighting factor applied by the jth middle node 66m to the output $O_i$. As noted above, bias value $\theta_m$ is provided by one of bias nodes 66b. As is conventional for adaptive networks, middle nodes 66m in this embodiment of the invention utilize a sigmoid function in the weighted sum $I_j$. The output $O_j$ from the jth one of middle nodes 66m may be expressed as follows:

$$O_j = \frac{1}{1 + \exp(-I_j)}$$

Of course, functions other than the sigmoid function may alternatively be used.

Similarly, output nodes 66o each produce a weighted sum function based upon the outputs $O_j$ from middle nodes 66m. In this example of the preferred embodiment of the invention, the weighted sums produced by output nodes 66o correspond to production header pressures $P_{ph}$ at various points in the network of surface lines SL. The production header pressures $P_{ph}$, at one of drill sites 2 corresponds to the wellhead pressure for each of the wells 4 associated with that drill site 2. In the example of FIG. 1, where two surface lines $SL_0$, $SL_1$ are received by central processing facility 6, two production header pressures $P_{ph0}$, $P_{ph1}$ are generated by output nodes 66o. The particular expressions for the weighted sum functions performed by the kth one of output nodes 66o, in this example, are as follows:

$$I_k = \sigma(W_{k,j} O_j + \theta_o)$$

and $$O_k = \frac{1}{1 + \exp(-I_k)}$$

In this case, the kth production header pressure $P_{phk}$ corresponds to the output $O_k$ from the kth one of output nodes 66o.

The adaptive network described hereinabove relative to FIG. 10 may be implemented as a computer program that is executable by system computer 22 having conventional technology. Such adaptive network computer programs are well-known in the art, as used in various applications such as image recognition, modeling, and the like.

The weighting factors $W_{j,i}$, $W_{k,j}$ are, of course, the critical factors in performing an accurate modeling of the production header pressures $P_{ph}$. According to the preferred embodiment of the present invention, the adaptive network is "trained" in order to set the weighting factors $W_{j,i}$, $W_{k,j}$ by way of the well-known backpropagation technique. Specifically, the training of the adaptive network is performed by the iterative application of sets of input values to the adaptive network, with weighting factors $Wj,i$, $Wk,j$ in an initialized state, operating the network to generate output results, comparing the results to known modeled or measured response of the hydraulics of the network of surface lines SL in the production field to the same input values. According to the backpropagation approach, the difference between the output values generated by the adaptive network and the desired output results (from measurement or modeling) are used to adjust the weighting factors $Wj,i$, $Wk,j$ according to an algorithm, such as the generalized delta rule. A description of the backpropagation algorithm according to the preferred embodiment of the present invention is provided in the Stoisits, et al. paper incorporated hereinto by reference and noted above. The training of the adaptive network may require thousands or tens of thousands of iterations, with the training input values varying over and slightly beyond the range of inputs that may be expected in the operation of the production field. It is contemplated that the training of the adaptive network will be performed off-line, prior to the performance of the optimization method of FIG. 7. Indeed, the training and setting of the weighting factors $W_{j,i}$, $W_{k,j}$ may even be performed on a different computer from optimization computer system 30, and the resulting weighting factors $W_{j,i}$, $Wk,j$ simply stored in program disk storage 31, if desired. The off-line training approach allows the adaptive network to be performed by system computer 22 in recall mode, thus performing process 54 extremely rapidly.

Through the operation of the adaptive network described hereinabove relative to FIG. 10, system computer 22 uses the oil, gas, and water output from each drill site $2_i$ to determine the production header pressure $P_{ph}$ at each drill site $2_i$. As is evident from the foregoing description, the determination of the production header pressure $P_{ph}$ at each drill site $2_i$ takes the output from all other drill sites 2 into account, along with the hydraulic response of the network of surface lines SL in the drill site and also the pressure at separator 8 in central processing facility 6. As noted above, the production field of FIG. 1 includes a single central processing facility 6; however, the adaptive network used in modeling surface line hydraulics may be modified to consider multiple central processing facilities 6 and, if desired, to include the effects of rerouting of wells 4 and drill sites 2 among these central processing facilities 6, as described in the Stoisits et al. article incorporated hereinto by reference.

Figure 11:
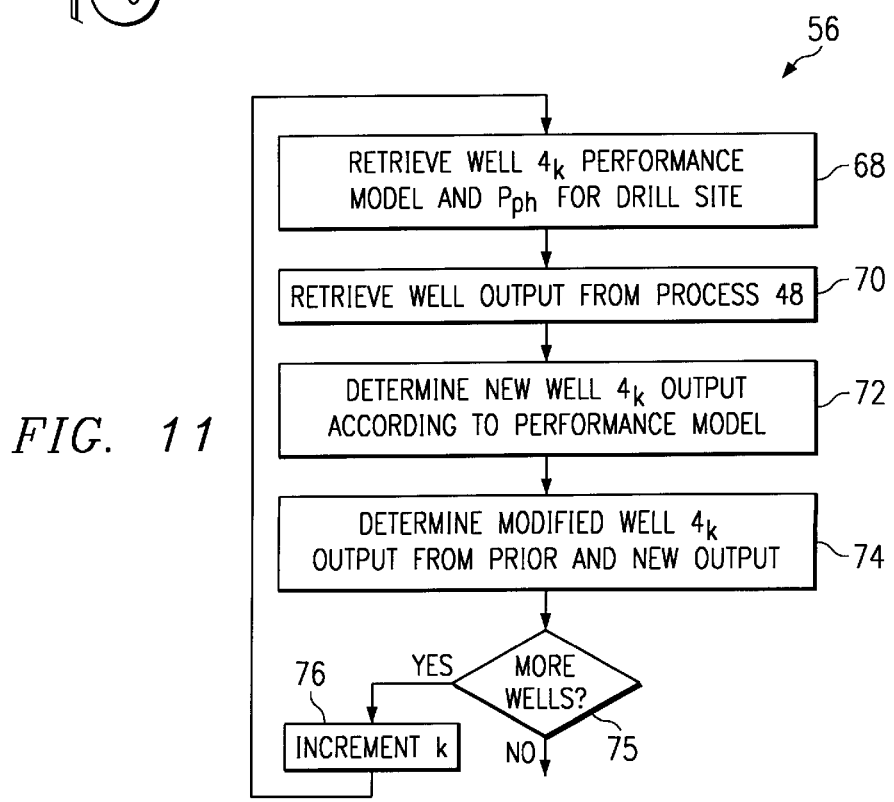
FIG. 11 is a flow chart illustrating the operation of the modifying of well output to take surface line hydraulics into account in the optimization method according to the preferred embodiment of the present invention.

The production header pressures $P_{ph}$ determined in process 54 will generally be different from assumptions used in process 48 to determine the production from each well. As noted hereinabove, the production header pressure $P_{ph}$ is an important factor in the fluid produced from a well, as it is the difference in pressure between the reservoir pressure $P_r$ and the downhole pressure $P_{wf}$ (which corresponds to the production header pressure $P_{ph}$ plus the static head and frictional losses within the well) that determines the flow from the reservoir. Accordingly, system computer 22 next performs process 56 to modify the evaluated production from each of wells 4 from that determined in process 48, as will now be described in detail with reference to FIG. 11.

Process 56 begins with process 68, in which system computer 22 retrieves a performance model for a well $4_k$ in the production field. According to the preferred embodiment of the present invention, system computer 22 stores, for example in data disk storage device 32, a performance model for each of wells 4 in the production field. This performance model, preferably based upon actual well performance measurements, models the dependence of the total fluid flow rate ($Q_{tf,k}$) for a well $4_k$ upon its production header pressure $P_{ph,k}$ as expressed according to the relationship:

$$Q_{tf,k} = Q_{ref,k} + PI_k(P_{ref} - P_{ph,k})$$

where $Q_{ref,k}$ corresponds to the fluid flow rate from kth well $4k$ at a reference production header pressure $P_{ref}$, and where $PI_k$ is the rate of change of fluid flow from well $4k$ as a function of production header pressure, and may be referred to as the surface productivity index. Surface productivity index PI is typically assumed to equal the downhole productivity index over all formations (e.g., corresponds to the sum of the downhole productivity indices for formations FA and FC of FIG. 4), and is determined from well data obtained for each individual well in the field. This performance model information is retrieved from data disk storage 32 for well $4_k$, along with the production header pressure $P_{ph}$ for the associated drill site $2_i$, by system computer 22 in process 68. While this well performance model is retrieved from computer storage in this example, it is of course contemplated that any such model which relates well flow to well head pressure may be utilized. In process 70, system computer 22 retrieves the previously evaluated well output for well $4_k$ from data disk storage 32; as noted above, this value of well output is the cumulative flow for all phases, and corresponds to a flow value at a particular reference production header pressure (either presumed, modeled, or measured).

In process 72, system computer 22 applies the performance model to determine a new total fluid flow $Q_{tf}$ at the production header pressure $P_{ph}$ that was evaluated by the adaptive network program executed by system computer 22 in process 54. As noted above, process 72 may be performed by the application of the linear performance model relationship described above, to return a new well output for well $4_k$.

In process 74, system computer 22 determines a modified well output for well $4_k$ based upon the well output derived in process 48, and also the new well output derived in process 72. It has been observed that process 74 may return a suitably accurate estimate of the well output simply by calculating the average well output of the outputs derived in processes 48 and 72. Alternatively, re-evaluation of the well output by repeating processes 48, 54, and 72 for all wells 4 in the field until convergence may also be used. Regardless of the technique, system computer 22 stores a modified well output for well $4_k$ in memory, such as data disk storage 32, as a result of process 74. Because of the process described hereinabove, this modified well output takes into account the effects of production from other wells 4 in the production field, particularly in regard to the surface line hydraulic effects of such production.

Decision 75 determines if additional wells 4 remain to be processed by processes 68, 70, 72, 74; if so, the index k is incremented in process 76 and control passes to process 68 by way of which system computer 22 retrieves the appropriate performance model and production header pressure $P_{ph}$ for the next well $4_k$. Upon completion of the process for all wells 4 (i.e., decision 75 is NO), the optimization process continues with process 58 (FIG. 9).

In process 58, system computer 22 receives the modified well outputs derived in process 56 each well 4 in the entire production field, and evaluates the overall gas output (QGAS) and oil output (QOIL) of the field. Process 58 is performed simply by summing the modified gas and oil output from process 56. These output values QGAS, QOIL determine the value of the fitness function for solution vector $44_j$ under analysis.

In decision 59, system computer 22 determines whether the gas output QGAS determined in process 58 exceeds the gas compression capacity of central processing facility 6. As noted above, for production fields such as the exemplary field in FIG. 1, gas handing and compression capacity is a significant constraint on the optimization of the field, especially considering the large capital costs involved in gas compression equipment; the gas compression capacity is an even more significant constraint in those production fields that do not produce gas for market. If solution vector $44_j$ under analysis renders a value of gas output QGAS that is within the capacity of central processing facility 6 (decision 59 is NO), control passes to process 62, in which system computer 22 stores the oil output value QOIL in memory, associated with the current solution vector $44_j$. However, if system computer 22 determines that the value of gas output QGAS exceeds the gas compression capacity (decision 59 is YES), penalty function process 60 is then performed by system computer 22 to downgrade the oil output value QOIL. In this example, a modified value of oil output QOIL is derived by dividing the oil output value QOIL from process 56 by a large factor (e.g., 100). This modified oil output value QOIL is then stored in memory in connection with solution vector $44_j$, in process 62.

Decision 63 is then performed to determine if additional solution vectors 44 remain to be evaluated. If so (decision 63 is YES), the solution vector index j is incremented (process 64) and evaluation process 36 is repeated by system computer 22 for the next solution vector $44_j$, in the manner described hereinabove. If all solution vectors 44 have been evaluated, and thus have an oil output value QOIL (either directly from process 56, or modified by process 60) stored in memory in connection therewith, control passes to decision 37 of FIG. 7, as will now be described.

Decision 37 is performed by system computer 22 to identify when the optimization process may be terminated by evaluating a completion criterion. Various techniques for determining completion of the optimization may be used. One example is simply to determine the number of iterations of process 36 that has been performed, and to compare this number of iterations against a limit. Another example of a completion criterion is a comparison of the difference in the oil output QOIL for the best one of solution vectors 44 in the two most recent passes through evaluation process 36 against a limit $\epsilon$; if the difference in the best oil output value QOIL exceeds this convergence limit $\epsilon$, then the completion criterion is not met (decision 37 is NO). In any event, upon decision 37 indicating that the completion criterion is not met, additional optimization by evaluating a next generation of solution vectors 44 will be performed, beginning with process 40.

In process 40, system computer 22 produces the next generation of solution vectors 44 in the conventional manner for genetic algorithms, which may be effected according to any one of a number of approaches.

For example, process 40 may be performed by system computer 22 first selecting pairs of solution vectors 44 to serve as "parents" for the next generation. In this example, the selection of parent chromosomes is made in a weighted random manner, with the probability of selection of a solution vector 44 being weighted by its fitness function value, with solution vectors 44 that resulted in higher oil output values QOIL more likely to be used in producing the next generation of solution vectors 44 than those with lower output values QOIL (either directly, or due to violation of the gas compression capacity).

Figure 8C:
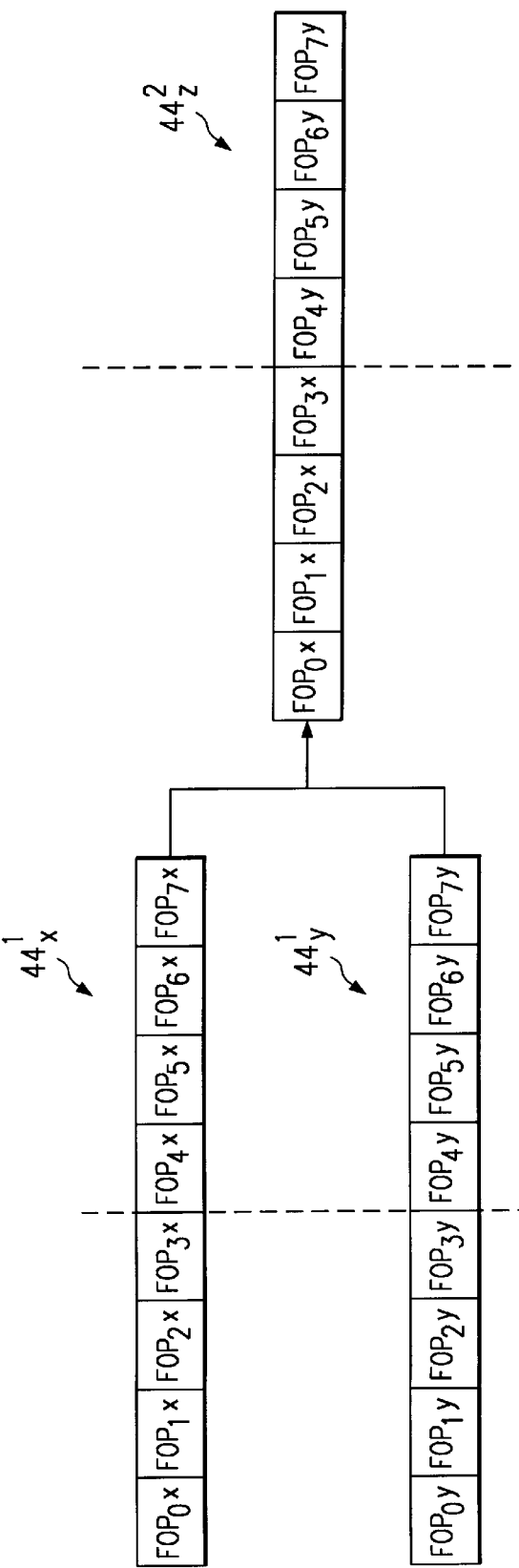
FIG. 8c is a diagram illustrating the formation of a second-generation solution vector from two first-generation solution vectors, according to the preferred embodiment of the present invention.

Referring now to FIG. 8c, the operation of process 40 in producing a next generation of solution vectors SV will now be described by way of an example. In this example, solution vectors $44_x^1$ and $44_y^1$ have been selected from a first generation of solution vectors $44^1$ (this first generation indicated by the $^1$ superscript) to be parents for a solution vector $44_z^2$ in a second generation (this second generation indicated by the $^2$ superscript). Each of solution vectors $44_x^1$ and $44_y^1$ include a set of eight field operating parameters $FOP_0$ through $FOP_7$ in this example. As in conventional genetic algorithm techniques, a "crossover" point is randomly selected at a particular position within solution vectors $44_x^1$ and $44_y^1$; in this example, the crossover point is between field operating parameters $FOP_3$, $FOP_4$ in each of solution vectors $44_x^1$ and $44_y^1$.

The second generation solution vector $44_z^2$ is produced by using parts of each of solution vectors $44_x^1$ and $44_y^1$ as determined by the location of the crossover point. In this example, second-generation solution vector $44_z^2$ receives field operating parameters $FOP_0x$ through $FOP_3x$ from first-generation solution vector $44_x^1$, and field operating parameters $FOP_4y$ through $FOP_7y$ from first-generation solution vector $44_y^1$, since the crossover point is between field operating parameters $FOP_3$ and $FOP_4$. This second-generation solution vector $44_z^2$ is then used in the next pass through evaluation process 36.

As is well known in the art of genetic algorithms, it is useful to include some degree of randomness in the production of successive generations of solution vectors 44, to avoid convergence on false, local extrema. This randomness may be implemented by way of periodic "mutations" in the production of a generation of solution vectors 44, for example by periodically inserting random values of field operating parameters FOP, such as in one of every one thousand solution vectors.

Alternatively, other known genetic algorithm techniques for generating successive generations of chromosomes may be used. These examples include rank ordering of solution vectors 44 according to their fitness function value, unranked pairing methods in which the probability of reproduction is assigned by fitness function value, random or continuous crossover techniques, "hill climbing" techniques, and the like.

Following the production of the next generation of solution vectors 44, control passes back to evaluation process 36, in which system computer 22 evaluates the next generation of solution vectors 44 in the same manner as described hereinabove. This iterative evaluation of generations of solution vectors 44 continues until the desired degree of convergence is reached, as determined in decision 37.

At such time as decision 37 returns a YES result, the solution vector 44 providing the new maximum result of oil output QOUT will contain an optimized set of values of field operating parameters FOP that may be used by production personnel to optimize the production conditions of the production field, without generating excess gas production beyond the compression capacity. In this embodiment of the invention, a result of YES for decision 37 causes process 42 to then be performed by system computer 22 to generate a report of that optimized solution vector 44 that provided the best value of oil output QOIL. This report may be printed or displayed via the appropriate output device 26, 28, may be stored in disk storage device 29 for later analysis, or may be otherwise communicated to production field operational personnel. As noted above, each solution vector 44 includes incremental oil-gas ratio cutoff and formation oil-gas cutoff values IGOR, FGOR, respectively, which are used by production field operating personnel to place the production field in the optimized operating condition as determined according to the preferred embodiment of the invention. Production is optimized as a result.

According to the preferred embodiment of the invention, therefore, an automated system and method for optimizing the operation of a complex modern oil and gas production field is provided. This automated system and method provides for rapid determination of field operating parameters that are understandable and useful by the production personnel, in a manner that is not vulnerable to error due to convergence upon false local extrema (as is the case with conventional derivative-based rigorous models). Actual well data are used as appropriate in the optimization according to the preferred embodiment of the invention, and the effects of neighboring wells in the production field by way of surface line hydraulic effects are considered. Furthermore, adaptive networks are used in the evaluation of the surface line hydraulic analysis which, due to off-line "training" of the adaptive network outside of the optimization process, may be performed in a "recall" mode and thus without requiring significant computing capacity.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to determine optimized operating conditions for a petroleum production field having a plurality of wells, comprising the steps of:
    producing a first generation of solution vectors, each solution vector including a plurality of field operating parameters associated with the production field;
    evaluating product output from the production field for each of the first generation of solution vectors;
    producing a second generation of solution vectors from selected solution vectors of the first generation, according to a genetic algorithm;
    repeating the evaluating and producing steps until a convergence criterion is met; and
    reporting the field operating parameters from a solution vector having an optimum product output, for use in operating the production field.

2. The method of claim 1, wherein the evaluating step comprises:
    determining the status of each of the plurality of wells from the field operating parameters;
    for each of the plurality of wells, estimating fluid output from the well based upon its status;
    operating a surface line hydraulic model using the estimated fluid output from each well, to estimate production header pressures for each of the plurality of wells;
    modifying the estimated fluid output from the well using the estimated production header pressures; and
    determining the product output from the production field from the modified estimated fluid output.

3. The method of claim 2, wherein the surface line hydraulic model is an adaptive network model.

4. The method of claim 2, further comprising:
    training the adaptive network model by way of back-propagation;
    and wherein the step of operating the surface line hydraulic model is performed by operating the adaptive network model in recall mode.

5. The method of claim 2, wherein the plurality of wells are arranged according to a plurality of drill sites, each drill site associated with a group of wells;
    wherein the evaluating step further comprises:
        for each of the plurality of drill sites, after the step of estimating fluid output from the well, summing the fluid output for the group of wells associated with the drill site;

and wherein the step of operating the surface line hydraulic model estimates production header pressures at each of the plurality of drill sites using the summed fluid output for each of the plurality of drill sites.

6. The method of claim 5, wherein the surface line hydraulic model is an adaptive network model.

7. The method of claim 5, wherein the field operating parameters comprise incremental gas-oil ratio cutoff values and formation gas-oil ratio cutoff values associated with each of the plurality of drill sites.

8. The method of claim 1, wherein the field operating parameters comprise well producing status indications for each of the plurality of wells.

9. The method of claim 1, wherein the product output evaluated in the evaluating step comprises an oil output value and a gas output value from the production field;

and further comprising, for each solution vector:
comparing the gas output value from the evaluating step with a gas compression capacity value for at least one central processing facility in the production field;
responsive to the comparing step determining that the gas output value exceeds the gas compression capacity value, downgrading the oil output value for the solution vector;

and wherein the probability of selection in the producing step corresponds to the oil output value.

10. A computer system for determining optimized operating conditions for a petroleum production field having a plurality of wells coupled to a central processing facility by way of a network of surface lines, comprising:
computer-readable memory for storing well data corresponding to operating characteristics of each of the plurality of wells;
an output device;
a system computer, coupled to the computer-readable memory and to the output device, and programmed to perform the operations of:
randomly producing an initial generation of solution vectors, each solution vector including a plurality of field operating parameters associated with the production field;
for each of a plurality of generations of solution vectors beginning with the initial generation, performing the operations of:
evaluating product output from the production field for each of the solution vectors in a current generation using the operating characteristics of each of the plurality of wells;
producing a subsequent generation of solution vectors from selected solution vectors of the current generation, according to a genetic algorithm; and
reporting, on the output device, the field operating parameters from a solution vector having an optimum product output, for use in operating the production field.

11. The computer system of claim 10, wherein the computer-readable memory is also for storing a surface line hydraulic model corresponding to operating characteristics of the network of surface lines;
and wherein the system computer is programmed to perform the evaluating operation by:
determining the status of each of the plurality of wells from the field operating parameters;
for each of the plurality of wells, estimating fluid output from the well based upon its status;
operating the surface line hydraulic model using the estimated fluid output from each well, to estimate production header pressures for each of the plurality of wells;
modifying the estimated fluid output from the well using the estimated production header pressures; and
determining the product output from the production field from the modified estimated fluid output.

12. The computer system of claim 11, wherein the surface line hydraulic model is stored in the computer-readable memory in the form of weighting factors for an adaptive network;
and wherein the system computer is programmed to perform the operation of operating the surface line hydraulic model by operating the adaptive network, in recall mode, using the estimated fluid output from each well.

13. The computer system of claim 11, wherein the plurality of wells are arranged according to a plurality of drill sites, each drill site associated with a group of wells;
wherein the evaluating operation further comprises:
for each of the plurality of drill sites, after the step of estimating fluid output from the well, summing the fluid output for the group of wells associated with the drill site;
and wherein the system computer is programmed to operate the surface line hydraulic model to estimate production header pressures at each of the plurality of drill sites using the summed fluid output for each of the plurality of drill sites.

14. The computer system of claim 13, wherein the field operating parameters comprise incremental gas-oil ratio cutoff values and formation gas-oil ratio cutoff values associated with each of the plurality of drill sites.

15. The computer system of claim 10, wherein the field operating parameters comprise well producing status indications for each of the plurality of wells.

16. The computer system of claim 10, wherein the product output evaluated in the evaluating operation comprises an oil output value and a gas output value from the production field;
wherein the system computer is further programmed to perform the operations of, for each solution vector:
comparing the gas output value from the evaluating operation with a gas compression capacity value for at least one central processing facility in the production field;
responsive to the comparing operation determining that the gas output value exceeds the gas compression capacity value, downgrading the oil output value for the solution vector;
and wherein the probability of selection in the operation of producing a subsequent generation of solution vectors corresponds to the oil output value.

17. A computer-readable memory configured so that, when read and used by a computer, the computer is directed to determine optimized operating conditions for a petroleum production field having a plurality of wells coupled to a central processing facility by way of a network of surface lines, said computer directed by a plurality of operations comprising:
producing an initial generation of solution vectors, each solution vector including a plurality of field operating parameters associated with the production field;
for each of a plurality of generations of solution vectors beginning with the initial generation, performing the operations of:

evaluating product output from the production field for each of the solution vectors in a current generation using operating characteristics of each of the plurality of wells;

producing a subsequent generation of solution vectors from selected solution vectors of the current generation, according to a genetic algorithm; and reporting, on an output device, the field operating parameters from a solution vector having an optimum product output, for use in operating the production field.

18. The computer-readable memory of claim 17, the evaluating operation further comprises:

determining the status of each of the plurality of wells from the field operating parameters;

for each of the plurality of wells, estimating fluid output from the well based upon its status;

operating a surface line hydraulic model corresponding to operating characteristics of the network of surface lines, using the estimated fluid output from each well, to estimate production header pressures for each of the plurality of wells;

modifying the estimated fluid output from the well using the estimated production header pressures; and determining the product output from the production field from the modified estimated fluid output.

19. The computer-readable memory of claim 18, wherein the computer-readable memory stores the surface line hydraulic model in the form of weighting factors for an adaptive network;

and wherein the operation of operating the surface line hydraulic model is performed by operating the adaptive network, in recall mode, using the estimated fluid output from each well.

20. The computer-readable memory of claim 17, wherein the plurality of wells are arranged according to a plurality of drill sites, each drill site associated with a group of wells;

wherein the evaluating operation further comprises:

for each of the plurality of drill sites, after the step of estimating fluid output from the well, summing the fluid output for the group of wells associated with the drill site;

and wherein the operation of operating the surface line hydraulic model to estimate production header pressures at each of the plurality of drill sites uses the summed fluid output for each of the plurality of drill sites.

21. The computer-readable memory of claim 20, wherein the field operating parameters comprise incremental gas-oil ratio cutoff values and formation gas-oil ratio cutoff values associated with each of the plurality of drill sites.

22. The computer-readable memory of claim 17, wherein the field operating parameters comprise well producing status indications for each of the plurality of wells.

23. The computer-readable memory of claim 17, wherein the product output evaluated in the evaluating operation comprises an oil output value and a gas output value from the production field;

wherein the plurality of operations further comprise, for each solution vector:

comparing the gas output value from the evaluating operation with a gas compression capacity value for at least one central processing facility in the production field;

responsive to the comparing operation determining that the gas output value exceeds the gas compression capacity value, downgrading the oil output value for the solution vector;

and wherein the probability of selection in the operation of producing a subsequent generation of solution vectors corresponds to the oil output value.

* * * * *

UNITED STATES PATENT AND TRADEMARK OFFICE
CERTIFICATE OF CORRECTION

PATENT NO.   : 6,236,894 B1
DATED        : May 22, 2001
INVENTOR(S)  : Richard F. Stoisits, Kelly D. Crawford, Donald J. MacAllister and Michael D. McCormack It is certified that error appears in the above-identified patent and that said Letters Patent is hereby corrected as shown below:

Column 7,
Line 57, "Q $P_r$-$P_{wf}$ =" should read -- Q$\propto$$P_r$-$P_{wf}$ = --

Column 10,
Line 10, "will in detail." should read -- will now be described in detail. --

Column 12,
Line 61, "bias value $O_m$ to middle" should read -- bias value $\theta_m$ to middle --

Column 13,
Line 5, "$I_j = \sigma(W_{j,i} O_i + \theta_m)$" should read -- $I_j = \Sigma(W_{j,i} O_i + \theta_m)$ --
Line 36, "$I_k = \sigma(W_{k,j} O_j + \theta_0)$" should read -- $I_k = \Sigma(W_{k,j} O_j + \theta_0)$ --

Column 14,
Line 61, "$Q_{ref,k} + PI_k(P_{ref} - P_{ph,k})$" should read -- $Q_{ref,k} + PI_k(P_{ref} - P_{ph,k})$ --

Column 17,
Line 11, "parameters FOP$_A$y through" should read -- parameters FOP$_4$y through --

Signed and Sealed this

Ninth Day of April, 2002

*Attest:*

*Attesting Officer*

JAMES E. ROGAN
*Director of the United States Patent and Trademark Office*